Dec. 18, 1956   H. GANGER   2,774,174
SINKER
Filed Jan. 13, 1955

INVENTOR
Harry Ganger,
BY Parker Cook
ATTORNEY

United States Patent Office 2,774,174
Patented Dec. 18, 1956

2,774,174

SINKER

Harry Ganger, Atlantic City, N. J.

Application January 13, 1955, Serial No. 481,590

1 Claim. (Cl. 43—44.99)

My invention relates to a new and useful improvement in a sinker. The sinker, popularly known on the Jersey coast as a "Dipsy," is a pyramidal one so that when used by a surf caster or pier fisherman, the sinker or dipsy will not roll over and over and be washed in by an incoming tide or moved too swiftly by the currents, especially when seaweed gets on the line to offer a resistance to the current.

Another object of the invention, therefore, is to provide a pyramidal sinker which in reality consists of a hollow lead frame or body portion having perforate side walls and a detachable cover so that chum, such as old mussels, pieces of clam, bloodworms, or even synthetic baits, saturated with fish oil, may be placed within the sinker to thus form the double function of acting not only as a sinker but also as an attractive chum pot.

Another object of the invention is to provide a pyramidal sinker that also acts as a chum pot with apertures or openings in the side walls, which openings are large enough to permit the chum to extend beyond the openings; and also provide openings large enough so that the gut of a hook or leader may be passed through the lower openings, thus doing away with the necessity of long wire or gut leaders attached to the line, which leaders often are entangled about the sinker.

Still another object of the invention is to provide a hollow pyramidal sinker cast of lead which may weigh a little less than the most popular lead sinkers, that is, four ounces or five ounces, but when filled with chum will weigh four ounces or five ounces, depending on the size of the frame or the thickness of the walls.

Another object of the invention is to provide a quickly detachable cover and to provide an attaching means that may be made of stainless steel so that when the sinker is emerged not only will the chum supposedly attract fish but the reflection from the shiny fastening means may also attract the fish.

With these and other objects in view the invention consists in certain new and novel arrangements and combinations of parts as will be hereinafter more fully described and pointed out in the claims.

Referring now to the drawings, showing a preferred embodiment,

It might be mentioned at the outset that the hooks do not have to be fastened to the sinker, as any other desired form of rigging may be used above the sinker; and, of course, a large hook and a small hook may be used, which is also a conventional rig along the Jersey coast.

Figure 1:
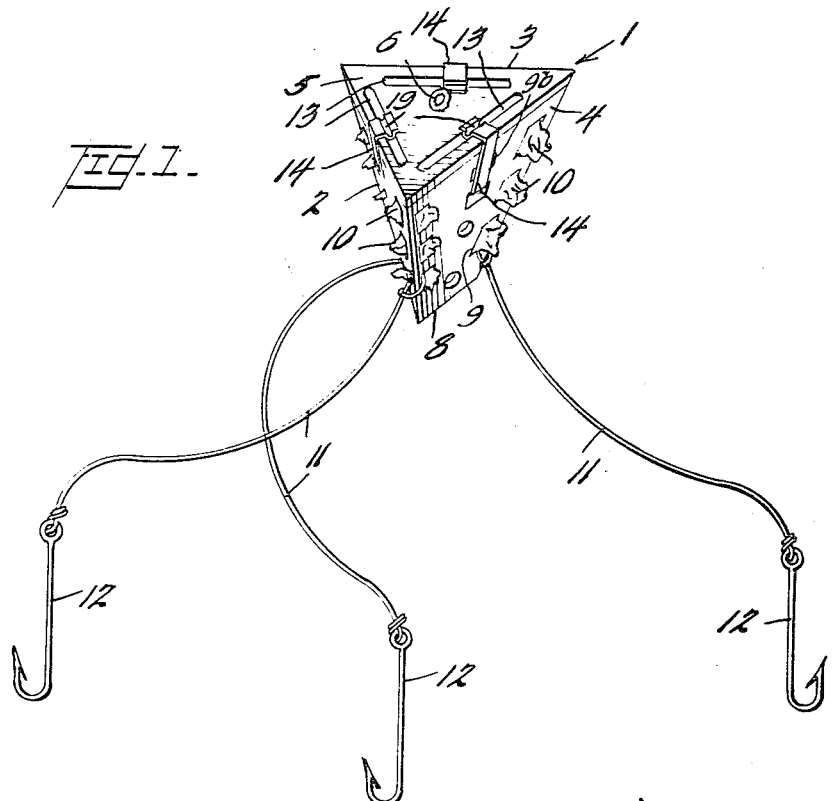
Fig. 1 is a perspective of the sinker, showing chum extending through the openings, and a manner of attaching the hooks to the sinker.
Figure 2:
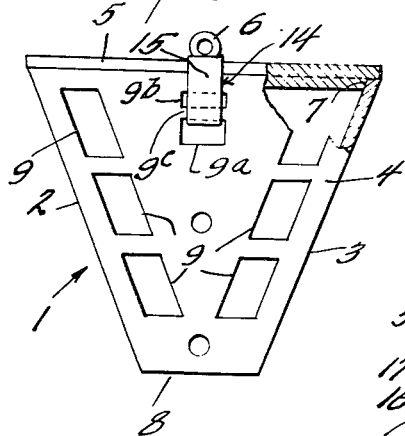
Fig. 2 is a front elevation showing parts broken away for the sake of illustration.
Figure 4:
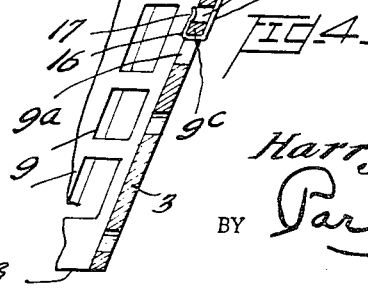
Fig. 4 is a sectional view taken on line 4—4 of Fig. 3.

Referring now more particularly to the structure, there is shown the body of the sinker 1 which is pyramidal in shape, that is, with three equal faces and tapering from the top to the bottom; and, as may be seen in the several views, it is in reality a hollow frame, that is, there will be the side walls 2, 3 and 4, as viewed in Fig. 1, and a cover 5 with its ring 6 to which is to be attached the fishing line; and this cover 5, as may be seen in Figs. 2 and 4, has the cutaway or chamfered portion 7 extending around its three sides to snugly fit within the frame or sinker 1.

As may be seen in Fig. 4, the bottom 8 is left open so that when the cover 5 is not attached, the frame 1 is open at both its top and bottom; but, of course, the bottom 8 is very much restricted.

Figure 3:
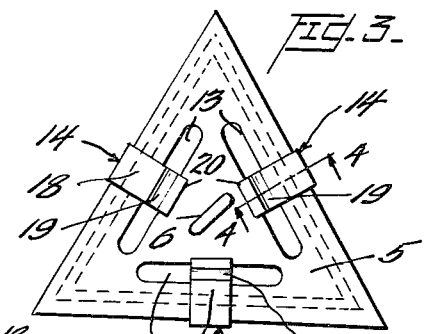
Fig. 3 is a top plan view showing the cover being held by its fastening means.

It might also be mentioned that Figs. 2 and 3 are about the actual size of a four ounce dipsy type sinker.

In each side wall there is a plurality of apertures 9, so that when the sinker 1 is filled with chum, such as mussels, clams, etc., they may extend out through these openings 9, as shown at 10, in Fig. 1. Besides these apertures 9 in each face, there are two aligned apertures 9a and 9b to form a resultant bar 9c over which the lower end of a fastening clip 14 is fitted, as will be mentioned shortly.

Now, heretofore mentioned, if desired the gut leaders 11 of the hooks 12 may have their upper loops pass through any of these openings 9 and then the hook 12 pass through the loop so that these hooks 12 are securely fastened to the sinker 1.

Now, referring more particularly to the cover 5, as may be seen in Fig. 3 it conforms to the shape of the top edge of the frame 1 and is provided with three similar slots 13 therein, each slot being parallel to the adjacent side face of the frame and also to the adjacent side edge of the cover so that the fastening means 14 may be secured to the framework 1 and then over the cover 5.

Inasmuch as these fastenings 14 are all the same, a description of one is a description of all. As may best be seen in Fig. 4, the clip 14 consists of a stainless steel strip having a vertical portion 15, and at its lower end a bent-back portion 16 which is also bent slightly inwardly as at 17, so that the clip 14 may be fitted (snapped) over the heretofore mentioned bar 9c. The upper part of the clip or fastening member 14 then extends flat across the cover 5 with its flat portion 18, crimped downwardly as at 19, and terminating in a small projecting end 20. This crimped portion 19 of the clip 14 fits within its adjacent slot 13 of the cover 5.

Thus, when all three clips 14 are in position, the cover 5 will be tightly held to the framework of the sinker 1. To remove the cover 5 it is only necessary to pry up the end 20 of the clip 14, swing it outwardly until the portion 15 is parallel with the cover 5, then push the clip 14 inwardly and lower it a little, and then remove the clip 14 from the frame 1. To insert the clip 14, of course, the operation described above is reversed. Thus the cover 5 is held tightly to the frame 1 and even though the surf caster might back-lash, if the line does not break, it will not pull the cover 5 from the sinker 1.

Throughout the specification, the sinker has been referred to as used by surf casters, but it will be understood that it could be used equally as well on the fishing piers where it is desired to cast out beyond the breakers; or, it can even be used from docks, where a short rod rather than a boat rod is used, or even with a hand line.

Also by making the clips 14 as shown, they can be swung from the cover 5 to remove the cover; and the clips 14 will not have to be removed from the frame 1, thus preventing them from getting lost. Also, as heretofore mentioned, the fastening clips 14 are made of a stainless steel with the idea of attracting the fish by something glistening in the water.

Thus, the sinker performs three functions: first, it acts in the normal way as a sinker; second, it acts as a miniature chum pot; and third, it acts as a lure by reflecting any light that strikes the fastening means.

It will be understood that these sinkers may be made in conventional sizes, which may weigh a little over or a little under the conventional weight when filled with chum.

Finally, as heretofore mentioned, the hooks do not have to be attached to the sinker, but it is thought that by having them in close proximity to the chum, the chances of a fish biting on a hook are better than if the hook is some distance away from the sinker.

Many slight changes might be made without departing from the spirit and scope of the invention.

Having thus described my invention what I claim is new and desire to secure by Letters Patent is:

A sinker consisting of a hollow lead pyramidal framework, the side walls of the framework having apertures large enough to let chum protrude therefrom; a detachable cover conforming in shape to the top edge of the framework and tightly fitting within the framework; a central eye in the cover for attaching a fishing line thereto; each of the side walls of the sinker having a relatively small bar formed near its upper edge; the cover being provided with a slot adjacent each of the side edges thereof, each slot being parallel with the adjacent side edge; and a stainless steel clip fitting over each of the respective bars and fitting within each of the respective slots in the cover for tightly holding the cover to the framework, and the clips being adapted to reflect any light that may strike the said clips when the sinker is immersed.

References Cited in the file of this patent

UNITED STATES PATENTS

| | | |
|---|---|---|
| 668,691 | Rudd | Feb. 26, 1901 |
| 717,681 | Hodge | Jan. 6, 1903 |
| 1,724,362 | Peterson | Aug. 13, 1929 |
| 2,611,988 | Gibson | Sept. 30, 1952 |
| 2,614,358 | Adams | Oct. 21, 1952 |